United States Patent [19]
Whitman

[11] Patent Number: 4,751,495
[45] Date of Patent: Jun. 14, 1988

[54] ANALOG PULSED HEAT TRACE MONITOR OR THE LIKE

[75] Inventor: Richard B. Whitman, Derran, Pa.

[73] Assignee: Raychem Corporation, Menlo Park, Calif.

[21] Appl. No.: 823,270

[22] Filed: Jan. 28, 1986

[51] Int. Cl.$^4$ .................... H04M 11/04; H05B 1/02
[52] U.S. Cl. ................. 340/310 R; 340/538; 340/588; 340/596; 340/640; 340/655; 340/870.17; 340/870.21; 219/510; 219/539; 219/327; 219/328; 137/59; 137/62; 138/33; 374/165; 374/183; 331/66
[58] Field of Search ........ 340/310 R, 310 A, 310 CP, 340/870.16, 870.17, 595, 596, 640, 538, 584, 870.21, 655, 588, 589; 361/45, 106; 219/511, 507–510, 535, 538, 539, 240, 241, 268, 269, 327, 328, 300, 301, 330, 338, 311, 320, 321; 138/33, 32, 104; 137/59, 62, 551; 374/163–167; 331/64, 66, 65

[56] References Cited

U.S. PATENT DOCUMENTS

| | | |
|---|---|---|
| 2,249,560 | 7/1941 | Howton . |
| 3,277,458 | 10/1966 | Greenwood ........................ 340/227 |
| 3,521,264 | 7/1970 | Limon ................................ 340/253 |
| 4,012,728 | 3/1977 | Fowler .............................. 340/224 |
| 4,016,429 | 4/1977 | Vercellotti et al. ................. 307/149 |
| 4,314,140 | 2/1982 | Hughes ................................ 138/33 |
| 4,316,179 | 2/1982 | Bliss et al. ........................ 340/538 |
| 4,357,602 | 11/1982 | Lemelson .......................... 340/539 |
| 4,429,299 | 1/1984 | Kabat et al. ..................... 340/310 R |
| 4,520,417 | 5/1985 | Frank .................................. 361/45 |
| 4,575,614 | 3/1986 | Hughes .............................. 219/327 |
| 4,608,552 | 8/1986 | Boutonnat et al. ............. 340/310 A |
| 4,611,274 | 9/1986 | Machino et al. ................ 340/310 R |
| 4,667,194 | 5/1987 | Frank ............................ 340/870.17 |

Primary Examiner—Donnie L. Crosland
Attorney, Agent, or Firm—Timothy H. P. Richardson; Herbert G. Burkard

[57] ABSTRACT

A system, utilizing an analog pulsed signal, is for monitoring the condition of a system, by way of illustration, a multi-circuit electrically heat-traced substrate. The system senses the temperature of the substrate at the end of a heat traced circuit, converts the temperature to a pulsed signal, and drives the pulsed signal along the heat tracing to the control and distribution panel for the heat tracing in direct opposition to the AC which powers the heat tracing. A receiver converts the pulsed signal to a digital temperature read-out. Utilization of an analog pulsed signal enables the system to be used in a multi-circuit system without interference or signal mixing from adjacent circuits.

16 Claims, 6 Drawing Sheets

ANALOG PULSED HEAT TRACE MONITOR OR THE LIKE

BACKGROUND OF THE INVENTION

This invention relates to an analog pulsed heat trace monitor or the like, and more particularly, to a system using analog pulsed signals to monitor a condition or changing condition which can be expressed by a whole digit or other alphanumeric symbol (such as temperature, pressure or flow). This invention is disclosed in the context of a system for monitoring the condition of systems protected by elongated heaters of the kind generally known as "heat tracing" or "heat trace". In such an application, the invention provides a system whereby the power which drives the heat tracing is used to also drive a signal generator, the output of which is applied to the heat tracing and sensed by a remote receiver. Because the signal is a pulsed one, impressed upon the power supply for the heat tracing, and because certain components of the system are maintained at earth ground, interference and "cross-talk" between heat tracing circuits is eliminated.

The method at present most commonly used to monitor the condition of a heat traced piping systems is to measure the temperature at the end of each heat traced circuit. In the case of a heat-trace based freeze protection system, the heat trace is expected to keep the temperature of the protected substrate (such as a pipe) at 40° F. or higher when the ambient air temperature is at or below 40° F. Conventionally, the temperature of the substrate is detected by a temperature sensing transducer associated with the substrate. Conventional transducers may be in the form of a thermocouple or resistance temperature detector (RTD), and the output signal of the sensor is, in conventional practice, brought to a receiver by a separate conductor provided for that purpose.

A control panel, with which a power supply may be associated, conventionally provides a circuit breaker for each heat trace circuit, and an annunciator panel typically providing an indicator light for each circuit. The thermocouples or RTDs are wired to the indicating windows, and typically, by depressing a "test" button adjacent to a particular window, a digital readout of the sensed temperature of the heat traced substrate assigned to the window can be had.

In the event of a circuit failure, causing the sensed temperature of the substrate to fall below an alarm limit, the window assigned to that circuit typically flashes red, and an audible alarm will sound.

A shortcoming of such arrangements is that failures of many types can trigger a low temperature alarm, but there is no way to know which component of the entire circuit has failed; all failure modes in such systems are temperature-related.

Another objection to prior art systems has been the cost of installing, along the entire length of the heat traced substrate, additional wiring for the monitoring system (i.e. RTD or thermocouple wire). Because heat trace circuits can be as long as 500 ft., and the distance from the power connections for the apparatus to the control panel on the order of 100 ft., extensive wiring can be involved, and the cost of such wiring can be as much as 20% of the total installation cost.

SUMMARY OF THE INVENTION

The present monitoring system is one which eliminates the need for additional wiring by transmitting over a heat trace element a signal which can be translated into a temperature reading at the control panel. By so doing, two distinct advantages are achieved: First, the cost of installing separate wiring is eliminated, and secondly, because, in the present invention, the temperature sensors and signal generators (transmitters) are powered by electrical current carried by the heat trace element itself, a loss of continuity in the system lends itself readily to an alarm function which is independent of temperature. Such a system is far easier to troubleshoot than one which, like prior art systems, has several potential failure modes, all temperature related.

In general, the present invention relates to a system for monitoring the condition of AC driven electrical heat trace elements, of the kind having parallel bus wires.

In reference to a single heat trace circuit (or "channel"), apparatus in accordance with the invention includes a temperature sensing element, preferably an RTD, located adjacent to the end of the heat trace element. A signal generator, responsive to the temperature sensing means, is placed in association with the protected substrate at the end of the heat trace element, and in response to the sensor, provides a pulsed signal of 15 volts DC peak and a current of less than 1 mA., the pulse rate of which is indicative of temperature. A signal generator draws its power from the bus wires of the heat trace element, and applies its signal to one of the bus wires in opposition to the power signal for the heat trace element.

A receiver, electrically coupled to the heat trace is arranged to "see" from the heat trace element only the pulsed temperature-indicating signal, not the power signal applied to the element, and circuitry associated with the receiver produces a readout indicative of temperature.

The above described apparatus is preferably incorporated into a multi-channel system, wherein each of the several heat trace elements is provided with a signal generator at its "end", and wherein the receivers are associated with a common control and annunciator unit.

The negative components of the electronics in the system are preferably run to earth ground. Due, therefore, to the very low impedance characteristics of commercial power transmission lines, the circuit in which the pulsed signal appears is readily completed through earth ground, an arrangement which enables the use of a multi-channel system without interference or signal mixing from adjacent circuits.

There are seen in the drawings, forms of the invention which are presently preferred (and which represent the best mode contemplated for carrying the invention into effect), but it should be understood that the invention is not limited to the precise arrangements and instrumentalities shown or described herein.

DETAILED DESCRIPTION

Figure 1:
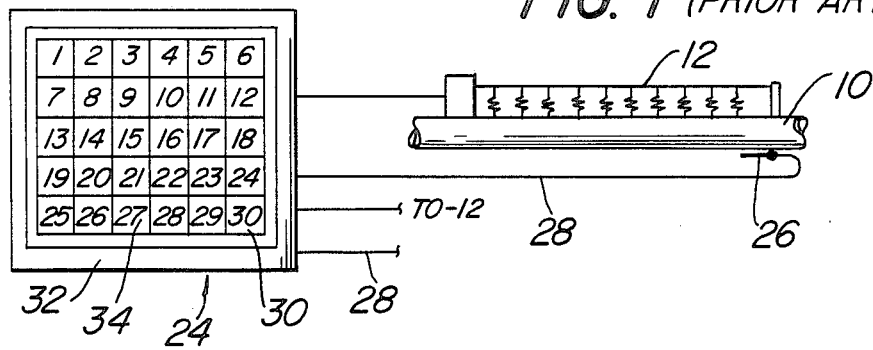
FIG. 1 is a schematic depiction of a conventional heat trace system in accordance with the prior art.
Figure 3:
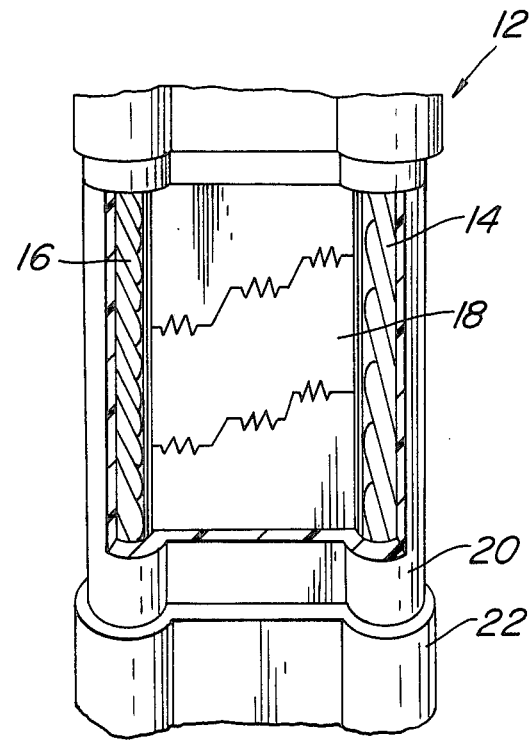
FIG. 3 is a detail view of a typical flexible elongated heater of the type generally referred to as "heat trace".

Referring now to the drawings in detail, wherein like reference numerals indicate like elements, there is seen schematically in FIG. 1, a typical conventional application of electrical heat tracing to a substrate piping system (designated generally by the reference numeral 10). Applied to the substrate 10 is a flexible elongated heater 12, of the kind generally referred to as "heat trace". The heat trace 12 is depicted schematically in FIG. 1 (and also FIG. 3) as a series of shunt resistances between parallel buses. FIG. 3 illustrates in somewhat greater detail the nature of such heaters.

Referring now to FIG. 3, the heat trace 12 may be seen to comprise a pair of parallel bus wires 14, 16, in contact with and spaced from each other by, a flexible electrically conductive polymer core 18. One or more insulating jackets, such as the jackets 20 and 22, encapsulate and protect the bus wires 14, 16 and the core 18. Not, per se, an aspect of the present invention, the core 18 of the heat trace 12 generally contains a conductive fill, such as carbon, which creates within the core 18 relatively high resistance electrical flow paths between the bus wires 14, 16 along the length of the heat trace 12, thus enabling the heat trace 12, when connected to an appropriate power supply, to generate heat.

Referring again to FIG. 1, in conventional systems, numerous heat trace elements 12 may be associated as separate circuits with a common power supply 24.

In freeze protection systems, the heat trace 12 is expected to maintain the temperature of the substrate 10 at 40° F. or higher. The temperature of the substrate 10 is detected by a temperature sensing element 26 (transducer) coupled to the substrate 10, and, which may conveniently take the form of a resistance temperature detector (RTD). The output signal of the sensor 26 is conventionally transmitted back to the power supply 24 by a separate conductor 28.

A control panel 30 associated with the power supply 24 may conventionally accommodate as many as forty-two heat trace circuits and circuit breakers, and an annunciator panel 32 provides a like number of indicating windows 34. By depressing a button (not shown) adjacent to a particular window, a common digital readout conventionally displays the temperature of the heat traced pipe or substrate assigned to that particular window.

Were a circuit failure to occur and the temperature of the substrate to fall below the desired 40° F., the window assigned to the affected circuit would typically flash red and an audible alarm would sound.

A principal drawback of the above-described conventional arrangement is that its installation requires, for each heat trace circuit, a separate conductor 28 from the RTD at the end of the traced substrate back to the control panel. The cost of such wiring (it has been found) can be as much as twenty percent (20%) of the total installation cost of heat tracing, and retrofitting to an existing heat trace system can also be of considerable cost. Heat traced substrates may be as long as 500 feet.

Figure 2:
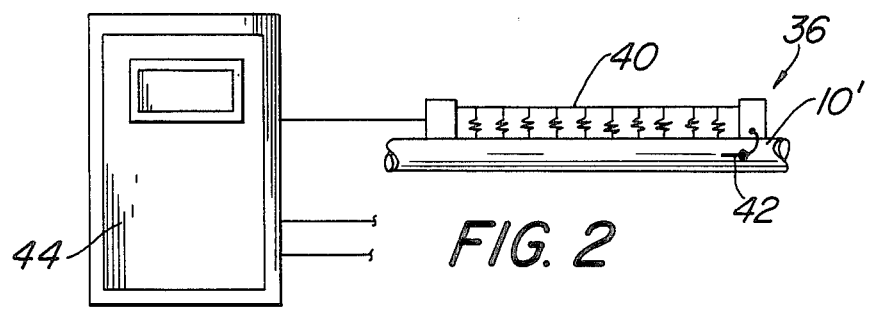
FIG. 2 is a view, similar to FIG. 1 of a system in accordance with the invention.

Referring now to FIG. 2, there is seen schematically a heat trace distribution and monitoring system in accordance with the invention, which eliminates the need for the additional wiring associated with conventional RTD installations, and which achieves other significant advantages as will now be described.

In the system illustrated in FIG. 2, a signal generator (transmitter), designated generally by the reference numeral 36, is associated with an end of a heat trace element 40. A sensor 42, preferably an RTD, senses the temperature of the substrate, here designated 10'. As will now be explained, the heat trace 40 itself provides the power for the signal generator 36, and the signal generated by the signal generator 36 is, in accordance with the invention, transmitted over the heat trace 40 (in direct opposition to the AC which powers the heat trace), to be translated into a temperature reading at a control panel 44.

Figure 4:
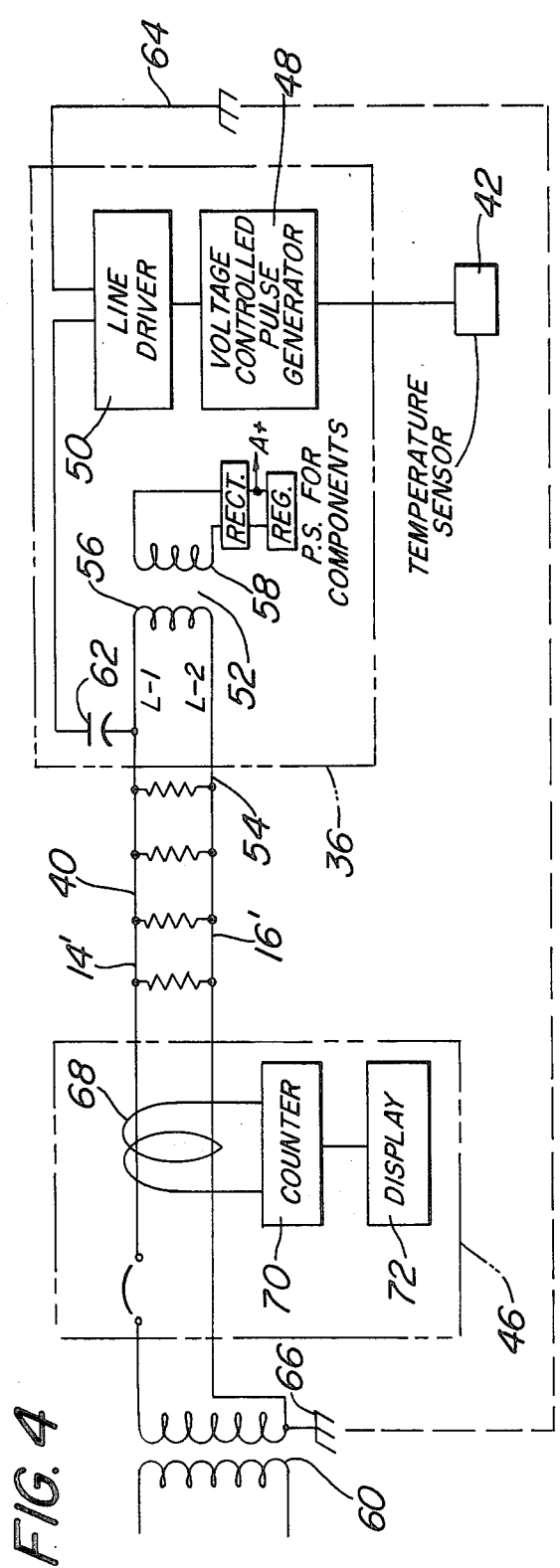
FIG. 4 is a schematic view, in somewhat greater detail, of a system in accordance with the invention.

The monitoring system in accordance with the invention will now be described in somewhat greater detail. FIG. 4 illustrates schematically a single channel (involving a single heat trace circuit) of the present monitoring system. The system comprises the above-mentioned signal generator (transmitter) 36, the heat trace 40 and a receiver, designated generally by the reference numeral 46, associated with the control panel 44. The signal generator 36 comprises a voltage controlled variable duty cycle pulse generator 48, which serves to gate a line driver 50 at a rate proportional to the substrate temperature sensed by the sensor 42. Power for the signal generator 36 is drawn from the heat trace 40 by means of a power supply transformer 52, connected to an end 54 of the heat trace 40. Primary 56 and secondary 58 windings of the power supply transformer 52 are shown. Power for the heat trace 40 is supplied by commercial line power, at 60.

In general, the signal generator (transmitter) 36 operates as follows:

The output of the sensor 42 is processed to produce an output in the range of 0 to 4 volts, in the presently preferred form of the apparatus, which in turn drives the pulse generator 48. The pulse generator 48 gates the line driver 50 at a rate directly proportional to the sensed temperature. For example, a pulse rate of 2,000 pulses per minute may conveniently be made to correspond to a temperature of 100° C. The output of the line driver 50 is driven, through a line-isolating capacitor 62, into the bus wire 14' of the heat trace 40 on the primary side of the power supply transformer 52 (the transformer 52, it will be recalled, being the power supply for the electrical components of the signal generator 36). As an alternative, the output of the line driver 50 may, if so desired, be applied to the bus wire 16'. One of the bus wires, it will be understood, is the phase wire and the other the neutral wire commonly associated with standard household or industrial wiring. The negative component of the electronics in the signal generator 36 is maintained, as indicated at 64, at earth ground.

The presently preferred characteristics of the pulsed signal leaving the signal generator 36 are as follows: A pulse rate of 2,000 pulses per minute corresponding to sensed temperature of 100° C.; a peak of fifteen volts DC; a current of less than 1 mA. through the duration of the pulse; and a pulse width of 2 microseconds.

It should be apparent from FIG. 4 that, due to the low impedance characteristics of the bus wires 14', 16' of the heat trace 40, and of commercial power generating equipment commonly used throughout the world, the pulse output signal of the signal generator 36 can complete itself through earth ground. The earth ground condition of the line power 60 is depicted in FIG. 4 at the reference numeral 66. By thus running the negative component to ground, the present principles can be applied to a multi-channel system without interference or signal mixing from adjacent channels.

Figure 5:
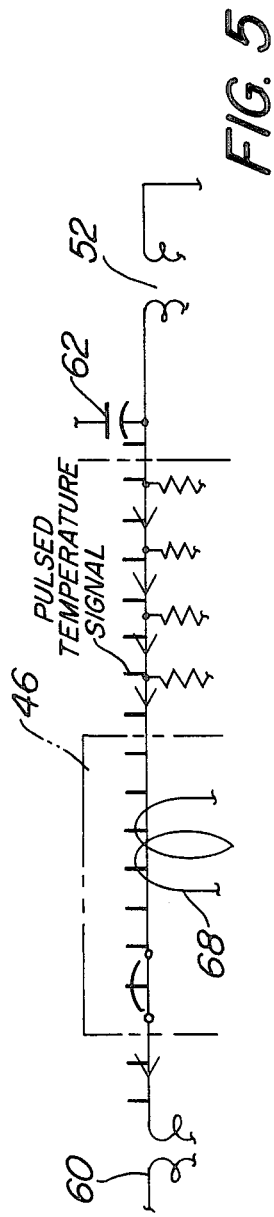
FIG. 5 is a partial view, similar to FIG. 4, illustrating, diagramatically, a temperature signal impressed upon the bus wire of a heat trace element.
Figure 6:
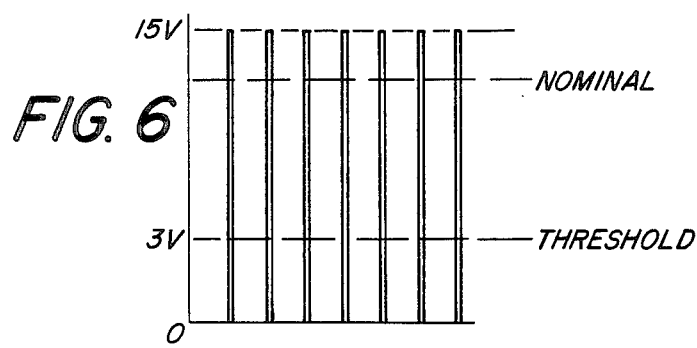
FIG. 6 is a graphic depiction of a typical output signal of a signal generator in accordance with the invention.
Figure 7:
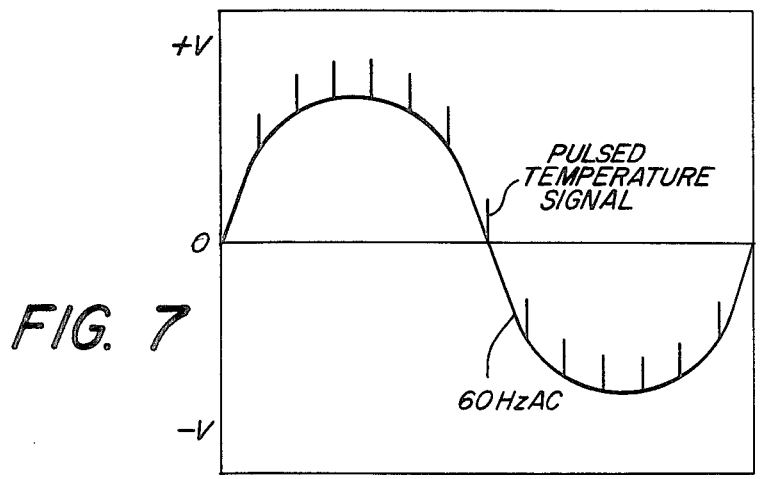
FIG. 7 depicts the appearance on an oscilloscope of a pulsed signal, impressed upon a 120 V. AC, 60 Hz. sine wave.

A typical output signal in accordance with the invention is depicted schematically in FIG. 5 and graphically in FIG. 6, and FIG. 7 depicts the appearance on an oscilloscope of the pulsed signal, impressed upon a 120 V. AC, 60 Hz sine wave.

Referring to FIG. 4, the manner of operation of the receiver 46 is as follows:

The receiver 46 consists of a current transformer 68, a counter 70 and a display 72.

The current transformer 68 is disposed around both bus wires 14', 16' of the heat trace 40, so that no differential is detected by the transformer 68 when only the AC power for the heat trace 40 passes through the bus wires 14', 16'. The appearance, however, on the bus wire 14' (or, as the case may be, 16'), of a pulsed signal from the signal generator 36 creates a differential across the bus wires 14', 16', which is detected by the current transformer 68 of the receiver 46.

The output of the current transformer 68 is a pulsed voltage between 0 and 15 V., at a rate directly proportional to temperature as detected by the signal generator 36. The output of the current transformer 68 is supplied to the counter 70, whose input circuitry is preferably such that it will detect only pulses between 3 and 15 volts, as indicated in FIG. 6. By so configuring the counter 70, stray voltage spikes which may be induced from outside sources, and which generally fall below three volts, will not affect the operation of the system. On the other hand, since the desired pulses are continuous, random voltage spikes above three volts constitute a negligible part of the total signal, and have been found not to affect the operation and accuracy of the system. Also, by allowing the counter 70 to "see" only voltages between 3 and 15 volts, relatively minor voltage drops in the pulse from the signal generator 36 as "seen" by the current transformer 68 (as may occur in extremely long heat trace circuits), do not interfere with operation of the system.

The counter 70 converts the sensed pulses to a linear output voltage directly proportional to the number of pulses counted, and such an output voltage, it will be understood, can be applied to a digital converter to produce a digital display 72.

Figure 8:
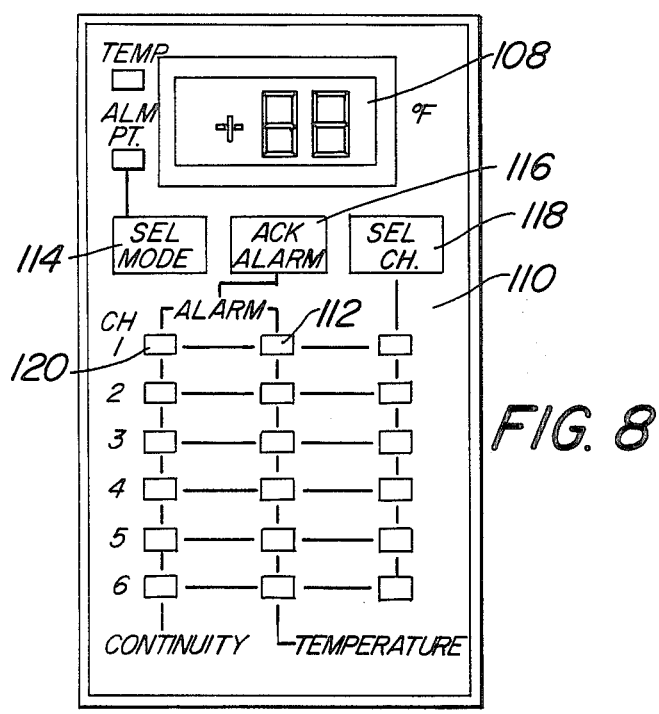
FIG. 8 shows a monitor and control panel for apparatus in accordance with the invention.
Figure 9:
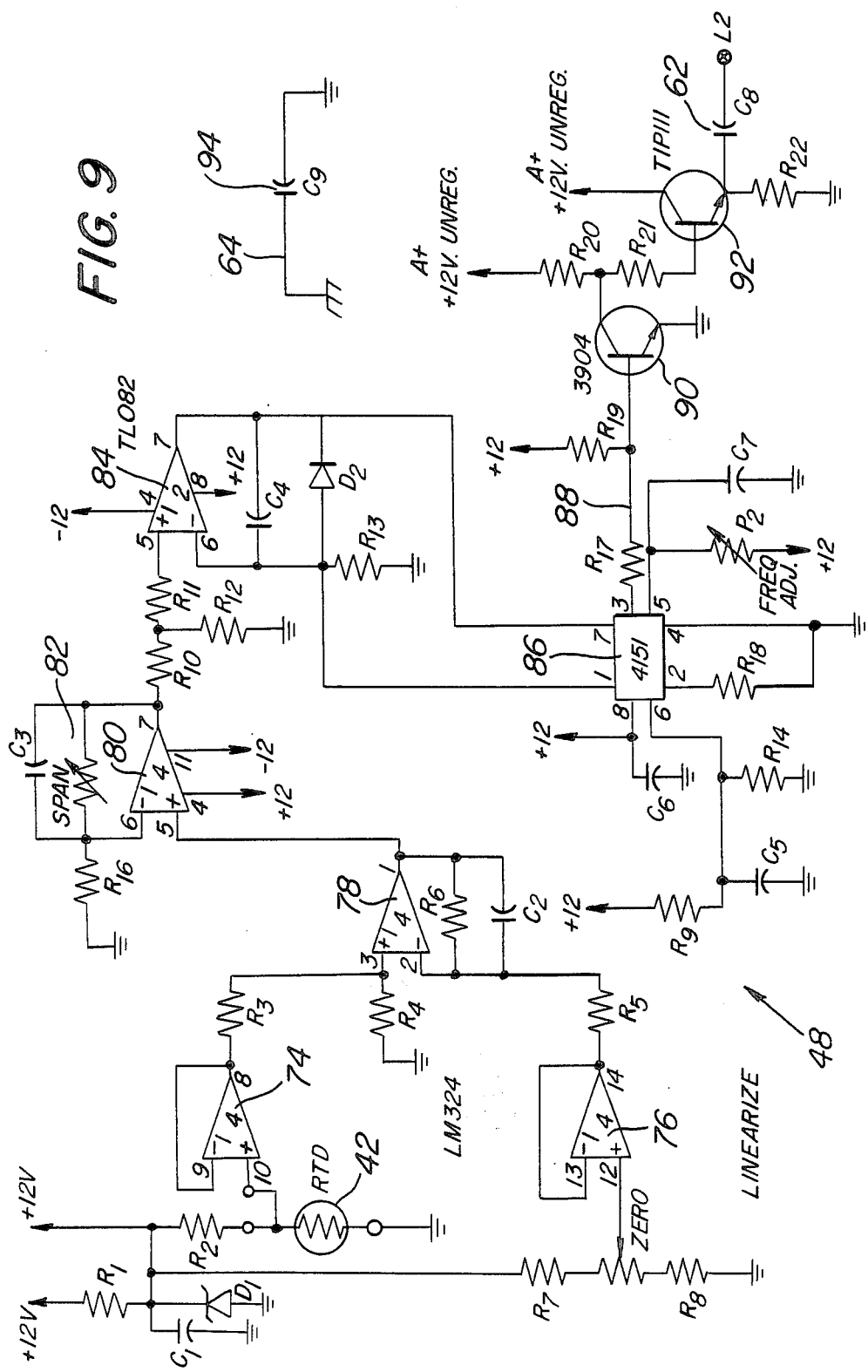
FIG. 9 is a circuit diagram depicting an exemplary signal generator, suitable for use in the invention.
Figure 10:
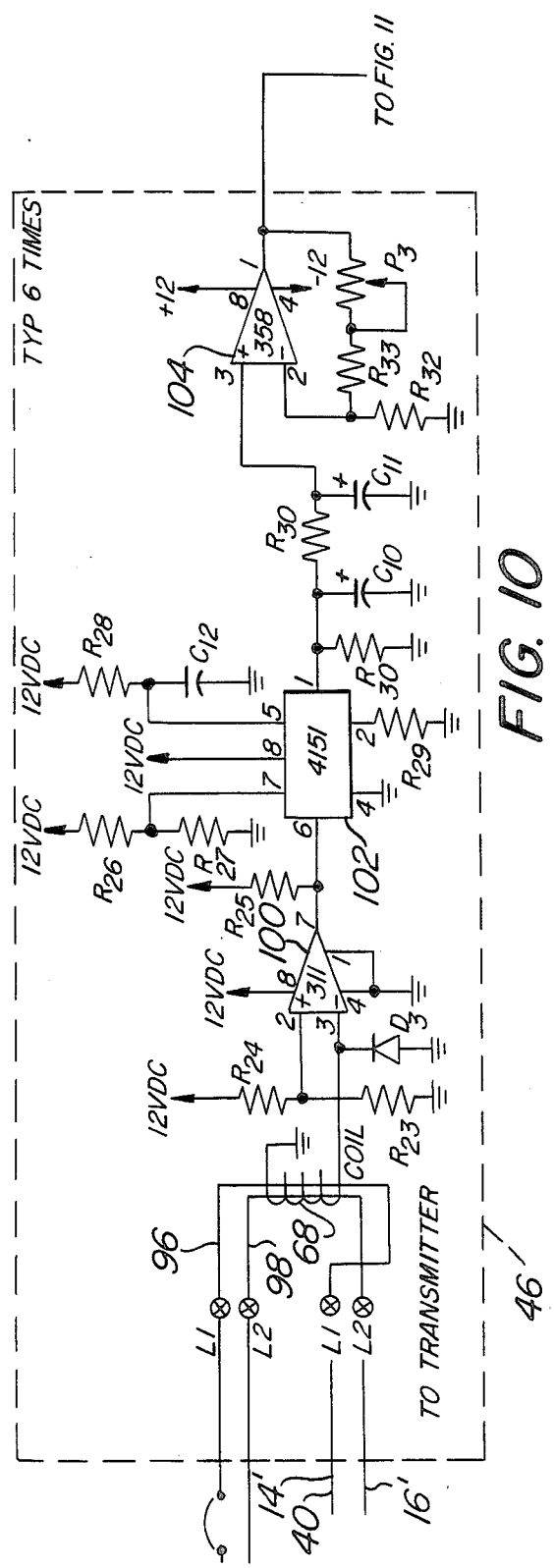
FIG. 10 is a circuit diagram depicting an exemplary receiver, suitable for use in the invention.

Particular circuitry for the various components of the present apparatus will occur to those skilled in the art, but FIGS. 8 through 10 provide illustrative examples of presently preferred arrangements adapted to achieve the intended purpose.

Referring to FIG. 9, there is seen exemplary circuitry whereby a sensor 42, which consists of a 100 ohm platinum RTD provides the desired 0 to 4 volt linear output voltage to drive the pulse generator 48.

Three operational amplifiers 74, 76 and 78, powered by a +12 volt supply provided by the power supply transformer 52, utilize the variable resistance of the RTD sensor 42 to produce a voltage which is directly proportional to temperature. The operational amplifiers 74, 76 and 78 may each be one-fourth of a quad I.C. (LM 324). The non-linear variation of the sensor 42 with temperature is compared to a voltage standard to linearize the voltage, and convert it to the desired 0 to 5 millivolt linear output. Assuming that the desired span of temperature measurement is 0° to 180° F., 0 millivolts represents 0° F. and 5 millivolts represents 180° F.

The linearized 0 to 5 millivolt output is applied to an operational amplifier 80 with a variable pot resistor 82, to increase or decrease, as desired, the span of temperature represented by the 0 to 5 millivolts.

The signal is then applied to another operational amplifier 84 (one-half of I.C. TL 082), which is a buffer and conditioner, and which converts the 0 to 5 millivolt signal to one of 0 to 4 volts. The linear 0 to 4 volt signal gates a variable duty cycle voltage controlled generator 86, which in turn, through the conductor 88, gates the transistor 90 and indirectly the transistor 92. The negative components of the circuitry are connected, through a capacitor 94, to earth ground.

The line driver 50 is comprised of the transistors 90 and 92 and associated circuitry. A constant 12 volt unregulated DC voltage is applied to the transistors 90 and 92, the 12 volts potential being derived from the secondary side of the power supply transformer 52, after rectification but before regulation (see FIG. 4).

Thus configured, the line driver 50 produces the desired pulse at a rate directly proportional to the temperature dictated by the RTD, 2,000 pulses per minute preferably representing 100° C., and 1,000 pulses per minute representing 0° C.

Exemplary designations and values for components depicted in FIG. 9 are as follows:

|  |  |  | uF |
| --- | --- | --- | --- |
| R1 | 4321 | C1 | .22 |
| R2, 8 | 1101 | C2–3 | .1 |
| R3–6, 12, 16 | 1001 | C4 | .0022 |
| R7 | 2002 | C5 | .01 |
| R9, 10 | 4991 | C6 | .22 |
| R11 | 1873 | C7 | .001 |
| R13 | 1003 | C8, 9 | .022 |
| R14 | 1002 | — | — |
| R15, 18 | 2611 | P1 | 200 Kohms |
| R17 | 470 | P2 | 50 Kohms |
| R19 | 20 Kohms | — | — |
| R20 | 5.1 Kohms | D1 | AD 589 |
| R21 | 1 Kohms | D2 | 4148 |
| R22 | 100 Kohms |  |  |

FIG. 10 illustrates exemplary circuitry for the receiver 46. Conductors 96 and 98, connected to the bus wires 14', 16' of the heat trace element 40 pass through the above-mentioned current transformer 68, and return to the control and distribution panel, the bus wire 14' ordinarily going to a 30 ampere circuit of the kind conventionally used to power the heat tracing circuits. The bus wire 16' goes to the neutral ground bar in the control and distribution panel.

As has been explained, the current transformer 68 "sees" the pulse signal impressed upon the bus wire 14'. The resulting signal is applied to an operational amplifier 100, which conditions the pulsed 15 volt signal to drive the capacitive counter 102. The capacitive counter 102 converts the pulses to a linear voltage output, the output being on the order of 0 to 4 millivolts. The output of the capacitive counter 102, in turn, is applied to another operational amplifier 104, which converts it to a 0 to 1 volt analog signal. This 0 to 1 volt analog output represents, at 0° F., and at 1 volt, 180° F. The 0 to 1 volt output is in turn fed to an analog-to-digital converter 106, seen in FIG. 11 and described below. The above, it will be understood, represents a single channel of a multi-channel device, each of the channels serving to sense the condition of a single heat trace element 40.

As is indicated in FIG. 10, power for the receiver 46 is plus and minus 12 volts DC, which may be supplied in any suitable and conventional manner.

Exemplary designations and values for components depicted in FIG. 10 are as follows:

|  |  |  | μf |
|---|---|---|---|
| R23 | 1.8 Kohms | C10 | 4.7 |
| R24 | 20 Kohms | C11 | 10 |
| R25 | 4.7 Kohms | C12 | .01 |
| R26, 27 | 10 Kohms | — | — |
| R28 | 4991 | | |
| R29 | 2003 | P3 | 20 Kohms |
| R30, 31 | 1503 | | |
| R32 | 2002 | | |
| R33 | 1001 | | |

Figure 11:
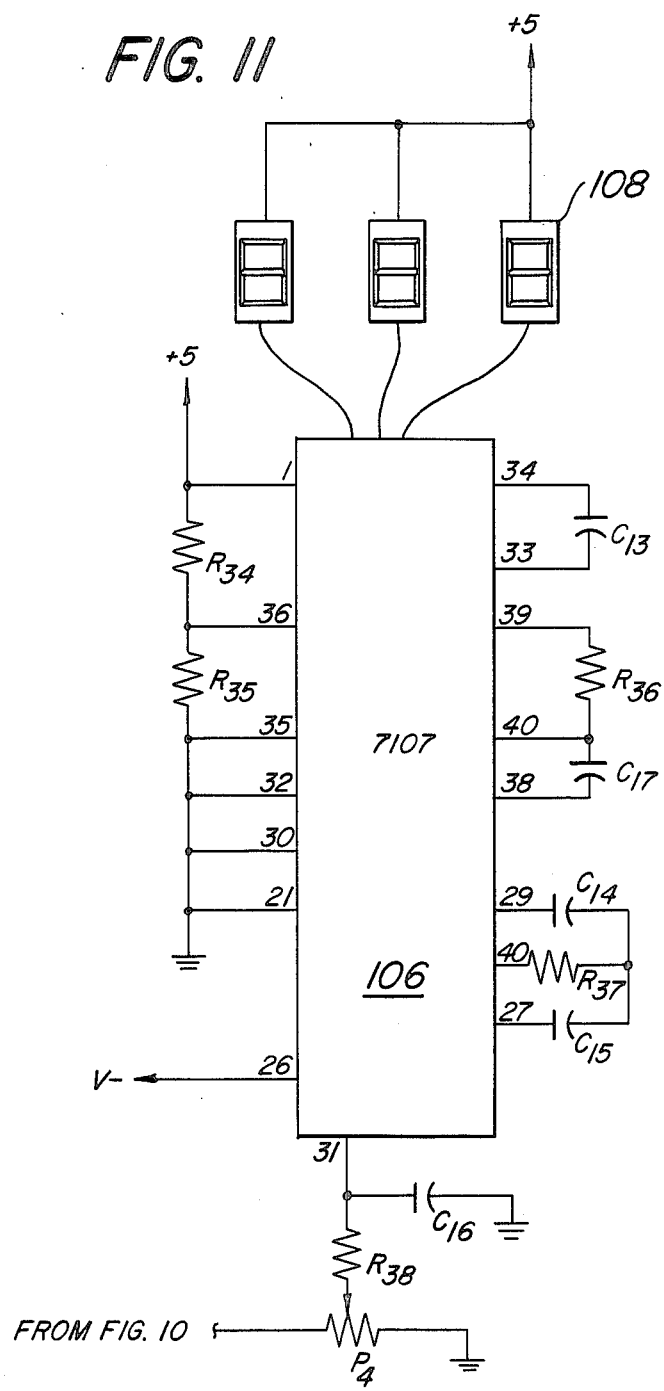
FIG. 11 depicts a converter and display for a single channel, suitable for use in the invention.

Referring now to FIG. 11, there is seen an analog-to-digital converter, based on a 7107 I.C., designated by the reference numeral 106. Display devices 108, such as conventional light-emitting diodes or liquid crystals are driven by the output of the converter 106.

Exemplary designations and values for components depicted in FIG. 11 are as follows:

|  |  |  | uf |
|---|---|---|---|
| R34 | 4422 | C13 | .1 |
| R35 | 1212 | C14 | .047 |
| R36 | 1003 | C14 | .047 |
| R37 | 470 Kohms | C15 | .22 |
| R38 | 1 Kohms | C16 | .01 |
| — | — | — | — |
| P4 | 50 Kohms | C17 | 100 pf |

FIG. 8 illustrates the face of a monitor and control panel 110 for a six-channel system. The panel 110 provides the above-mentioned display devices 108, and, in addition, for each channel, a low temperature alarm light 112. The alarm light 112 lights, for a given channel, when that channel reaches a pre-selected low temperature set point (alarm point), as for example 40° F., is reached. The alarm may be set, however, anywhere from 0° to 180° F. A mode select button 114 is also provided. In the "temperature" mode, the display 108 provides a temperature reading for a given channel. In the "alarm point" mode, the low temperature alarm set point may be seen and adjusted by suitable controls. An audible low temperature alarm may also be provided. A loss of continuity alarm light (and audible alarm) may be provided for each channel, to automatically be energized when continuity is lost in that channel.

The monitor and control panel 110 may also be provided, to good advantage, with an "acknowledge alarm" button 116 which serves to silence the low temperature or loss of continuity alarm. A channel select button 118 is also provided.

Thus, it will be seen that the present apparatus can, virtually instantaneously, confirm that a heat trace system is operational and that the temperatures are within desired limits. Failures, if they occur, can readily be noted and identified.

The signal generator 36, which runs on heat trace power and is disposed at the end of the heat tracing circuit, provides a ready means for detecting loss of continuity. It will be appreciated that if the receiver 46 receives no pulses, the output of the counter 70 and the display 72 go to 0 volts, a condition which can be made to trigger the loss of continuity alarm.

In summary, then, at the monitor and control panel 110, each circuit is assigned two indicating lights, one of which will energize if the temperature of the protected pipe 10 falls below a desired limit, such as 40° F., and the other which will energize if continuity is lost. Adjacent to the indicating lights is a button which, when depressed, causes the display 108 to read out the exact temperature of the protected pipe 10 in the selected circuit. If continuity is lost, no temperature reading can be taken.

Monitoring continuity when the ambient air temperature is above 45° F. and the system is not powered, can be accomplished by means of a simple timer (not shown) in parallel with an ambient sensing thermostat, which powers up the system periodically (such as, for example, each hour) for as little as 5 seconds. If a fault exists during such a test interval, an alarm will sound, and a holding circuit (not shown) can be provided to hold the alarm and the fault indicating light on even when the system is cycled off by the timer.

It should be understood that the foregoing analog pulse sensing techniques can be applied to other conditions or changing conditions capable of being expressed by a whole digit or other alphanumeric symbol. Examples of conditions which lend themselves to such sensing are temperature (as described above), pressure, flow rates and weight. Application of the present invention to such conditions entails utilization of an electrical appliance or apparatus which (like the above-described heat tracing) provides a closed electrical circuit which can power a signal generator and provide a carrier (like the bus wires 14', 16') for the condition-sensing signal. For example, in sensing pressure, the power supply for a remotely controlled valve may be used to power a signal generator, associated with a pressure transducer, and the resulting analog pulsed signal, impressed on the supply line, sensed in the above-manner to produce a readout indicative of pressure.

The present invention may be embodied in other specific forms without departing from its spirit or essential attributes. Accordingly, reference should be made to the appended claims, rather than the foregoing specification, for an indication of the scope of the invention.

I claim:
1. A monitored heating system which comprises:
    (1) an AC power source
    (2) an elongate heater comprising two elongate electrodes which are connected to the power source, and a plurality of resistive heating elements connected in parallel with each other between the electrodes;

(3) a temperature-sensing means for sensing the temperature of a substrate heated by the heater at a first location;

(4) a signal generator which
  (a) is associated with the temperature-sensing means,
  (b) is powered, through the electrodes, by the AC power source;
  (c) generates a pulsed DC signal having a pulse rate which is proportional to the temperature sensed by the temperature-sensing means, and
  (d) is coupled to the heater so that the pulsed signal is transmitted down one of the electrodes; and (5) a receiver which is coupled to the heater at a second location and which produces a response which is dependent on the pulse rate of the pulsed signal.

2. A system according to claim 1 wherein the signal generator is powered by DC obtained by rectifying the output from the secondary coil of a transformer having a primary coil which is connected to the electrodes.

3. A system according to claim 1 wherein the AC power source has a frequency of about 60 Hz.

4. A system according to claim 1 wherein the AC power source is a single phase 120 volt AC 60 Hz power source.

5. A system according to claim 4 wherein each of the pulses of the pulsed signal has substantially the same peak voltage.

6. A system according to claim 1 wherein the pulsed signal is produced continuously.

7. A system according to claim 1 wherein the AC power source is a single phase power source having a phase connected to one of the electrodes of the heater and a neutral connected to the other electrode of the heater.

8. A system according to claim 7 wherein the signal is imposed on the electrode connected to the phase of the power source and the electrical circuit of the signal is completed through a ground connection.

9. A system according to claim 1 wherein the pulsed DC signal is produced continuously.

10. A system according to claim 1 wherein the heater comprises two elongate electrodes which are embedded in a continuous strip of a conductive polymer.

11. A system according to claim 1 wherein the change in the pulse rate of the signal which is caused by a change in the temperature is directly proportional to the change in the temperature.

12. A system according to claim 1 wherein the temperature-sensing means is adjacent one end of the heater and the receiver is adjacent the other end of the heater.

13. A system according to claim 1 wherein the DC signal is imposed on only one of the electrodes and the receiver comprises means for comparing the currents in the two electrodes.

14. A monitored heating system which comprises
(1) an AC power source;
(2) a plurality of heating circuits which are connected in parallel with each other and each of which comprises
  (a) an elongate heater comprising two elongate electrodes which are connected to the power source, and a plurality of resistive heating elements connected in parallel with each other between the electrodes,
  (b) a temperature-sensing means for sensing the temperature of a substrate heated by the heater at a first location,
  (c) a signal generator which
    (i) is associated with the temperature sensing means,
    (ii) is powered by DC obtained by rectification of the AC output of the secondary winding of a transformer having a primary winding connected between the electrodes of the heater,
    (iii) generates a pulsed DC signal having a pulse rate which is proportional to the temperature sensed by the temperature-sensing means, and
    (iv) is coupled to the heater so that the pulsed signal is transmitted down one of the electrodes of the heater; and
  (d) a receiver which is coupled to the heater at a second location and which produces a response which is dependent on the pulse rate of the pulsed signal.

15. A system according to claim 14 wherein the AC power source is a single phase 120 volt AC 60 Hz power source having a phase connected to one of the electrodes of each heater and a grounded neutral connected to the other electrode of each heater; each of the signals is imposed on the electrode connected to the phase of the power source; the electrical circuit of each signal is completed through a grounded connection; and each receiver compares the currents in the two electrodes of the respective heater.

16. A system according to claim 14 wherein each heater comprises two elongate electrodes in contact with a conductive polymer element.

* * * * *